US009463771B2

(12) United States Patent
Humbert et al.

(10) Patent No.: US 9,463,771 B2
(45) Date of Patent: Oct. 11, 2016

(54) RESTRAINT SYSTEM PRETENSIONERS

(71) Applicant: AmSafe, Inc., Phoenix, AZ (US)

(72) Inventors: Todd J. Humbert, Chandler, AZ (US); Michael J. Walton, Phoenix, AZ (US)

(73) Assignee: AmSafe, Inc., Phoenix, AZ (US)

( * ) Notice: Subject to any disclaimer, the term of this patent is extended or adjusted under 35 U.S.C. 154(b) by 0 days.

(21) Appl. No.: 14/587,444

(22) Filed: Dec. 31, 2014

(65) Prior Publication Data

US 2015/0183396 A1 Jul. 2, 2015

Related U.S. Application Data

(60) Provisional application No. 61/922,700, filed on Dec. 31, 2013.

(51) Int. Cl.
| | |
|---|---|
| *B60R 22/46* | (2006.01) |
| *B60N 2/427* | (2006.01) |
| *B60N 2/42* | (2006.01) |
| *B60N 2/68* | (2006.01) |
| *B60R 22/195* | (2006.01) |
| *B60R 22/26* | (2006.01) |

(52) U.S. Cl.
CPC .......... *B60R 22/4619* (2013.01); *B60N 2/4242* (2013.01); *B60N 2/42736* (2013.01); *B60N 2/688* (2013.01); *B60R 22/1953* (2013.01); *B60R 22/26* (2013.01); *B60R 22/4623* (2013.01)

(58) Field of Classification Search
CPC .......... B60R 22/1953; B60R 22/4623; B60R 22/1952; B60R 22/4619; B60R 22/195; B60R 22/1951; B60R 22/4604; B60R 22/46; B60R 2022/468; B60N 2/4242; B60N 2/42736; B60N 2/42727; B60N 2/427; B60N 2/42
USPC .......................... 280/806; 242/374; 297/480
See application file for complete search history.

(56) References Cited

U.S. PATENT DOCUMENTS

| | | | |
|---|---|---|---|
| 4,423,846 A | * | 1/1984 | Fohl .................... B60R 22/1951 242/374 |
| 4,790,561 A | | 12/1988 | Brown |
| 8,469,400 B2 | | 6/2013 | Merrill et al. |
| 8,469,401 B2 | | 6/2013 | Humbert et al. |
| 2012/0025588 A1 | | 2/2012 | Humbert et al. |

FOREIGN PATENT DOCUMENTS

FR 2851974 B1 3/2006

OTHER PUBLICATIONS

European Search Report, Application No. 14200700.4, dated Aug. 5, 2015, 5 pages.

* cited by examiner

*Primary Examiner* — Keith Frisby
(74) *Attorney, Agent, or Firm* — Perkins Coie LLP

(57) ABSTRACT

Various embodiments of restraint system pretensioning devices for use in land, air, and sea vehicles are described herein. In one embodiment, a seat unit for use in a military land vehicle or helicopter includes a stroking device that enables the seat to move downwardly in response to sudden movement. The seat unit also includes a seat belt or harness that extends around the occupant in the seat. Sudden movement of the seat in response to an explosion or hard landing causes a pretensioning assembly to automatically pretension the seat harness.

20 Claims, 8 Drawing Sheets

RESTRAINT SYSTEM PRETENSIONERS

CROSS-REFERENCE TO RELATED APPLICATION INCORPORATED BY REFERENCE

The present application claims priority to U.S. Provisional Application No. 61/922,700, filed Dec. 31, 2013, and entitled "RESTRAINT SYSTEM PRETENSIONERS," which is incorporated herein by reference in its entirety.

TECHNICAL FIELD

The following disclosure is directed generally to the field of personal restraints for use in vehicles and, more particularly, to the field of restraint system pretensioners for use in military land vehicles, air vehicles, and other vehicles.

BACKGROUND

Military land vehicles generally have a three-, four-, or five-point seat/shoulder belt or harness in one or more of the vehicle seats. Civilian vehicles generally have a three-point shoulder belt/lap belt harness. To minimize or reduce injury during a collision or rollover, both military and civilian vehicles have used seat harness pretensioners. In a typical pretensioner, sensors on the vehicle detect the acceleration and/or deceleration forces of a collision or rollover, causing the pretensioners to actuate. The pretensioners then tighten up the seat harness around the seated passenger or driver milliseconds before the actual full impact or rollover. The tightened harness holds the passenger securely into the seat, reducing impact and rebound injuries. These existing pretensioners can be relatively complicated designs because they rely on pyrotechnic devices or electric motors operating a belt retractor, each controlled by an electronic trigger.

Many military land vehicles are designed to resist the destructive forces of mines and improvised explosive devices (IEDs). These explosive devices create unique risks for military land vehicles. Detonation of a large explosive device can generate forces on the vehicle exceeding 100 g, causing the vehicle to accelerate violently upwardly. To reduce the forces on the vehicle crew during a detonation, some military vehicles, such as the Joint Light Tactical Vehicle (JLTV), Bradley Fighting Vehicle, and Mine Resistant Ambush Protected Vehicle (MRAP), have blast attenuating seats. Blast attenuating seats are often supported on shock absorbing materials or are mounted on a shock absorbing structure, such as a stroking device, that allows the seat to move downwardly during a blast.

Conventional harness pretensioning techniques are generally impractical with these types of blast attenuating seats, because the seats move relative to the vehicle body during the blast and the acceleration is largely vertical, rather than horizontal. In addition, conventional harness pretensioning systems typically use pyrotechnic devices, electric retractor motors, or electronic sensors, which can be complicated and costly.

In addition to land vehicles, passengers in helicopters are subjected to similar types of extreme forces during crashes or hard landings. Some helicopters also have seats mounted on a stroking device. The challenges presented in harness pretensioning with blast attenuation seats are also present in helicopter seats mounted on stroking devices.

DETAILED DESCRIPTION

The present disclosure describes various embodiments of restraint system pretensioners for use with personal restraint systems in land, air, and sea vehicles. In one embodiment, for example, a seat unit for use in a land vehicle or helicopter includes a stroking device that enables the seat to move relative to the vehicle in response to an explosion or hard landing. The seat unit also includes a tensioning web or belt that is integral with a harness that extends around the seat occupant. Movement of the seat relative to the vehicle in response to sudden movement of the vehicle caused by an explosion or hard landing causes the tensioning belt to automatically pretension the seat harness. The various embodiments described herein can include devices, components or features that are at least generally similar to those described in U.S. Pat. No. 8,469,401, entitled "SEAT HARNESS PRETENSIONER," filed May 17, 2011; U.S. Pat. No. 8,649,400, entitled "SEAT HARNESS PRETENSIONER," filed Feb. 23, 2010; and U.S. Patent Application No. 61/154,731, entitled "SEAT HARNESS PRETENSIONER," filed Feb. 23, 2009; all of which are incorporated herein by reference in their entireties.

Certain details are set forth in the following description and in FIGS. 1-7B to provide a thorough understanding of various embodiments of the disclosure. Other details describing well-known structures and systems often associated with vehicle seats, seat stroking devices, web retractors, seat harnesses, and other personal restraint devices. have not been set forth in the following disclosure to avoid unnecessarily obscuring the description of the various embodiments of the present disclosure.

Many of the details, dimensions, angles, and other features shown in the Figures are merely illustrative of particular embodiments of the disclosure. Accordingly, other embodiments can add other details, dimensions, angles, and features without departing from the spirit or scope of the present disclosure. In addition, those of ordinary skill in the art will appreciate that further embodiments of the invention can be practiced without several of the details described below. In the Figures, identical reference numbers identify identical, or at least generally similar, elements.

Figure 1:
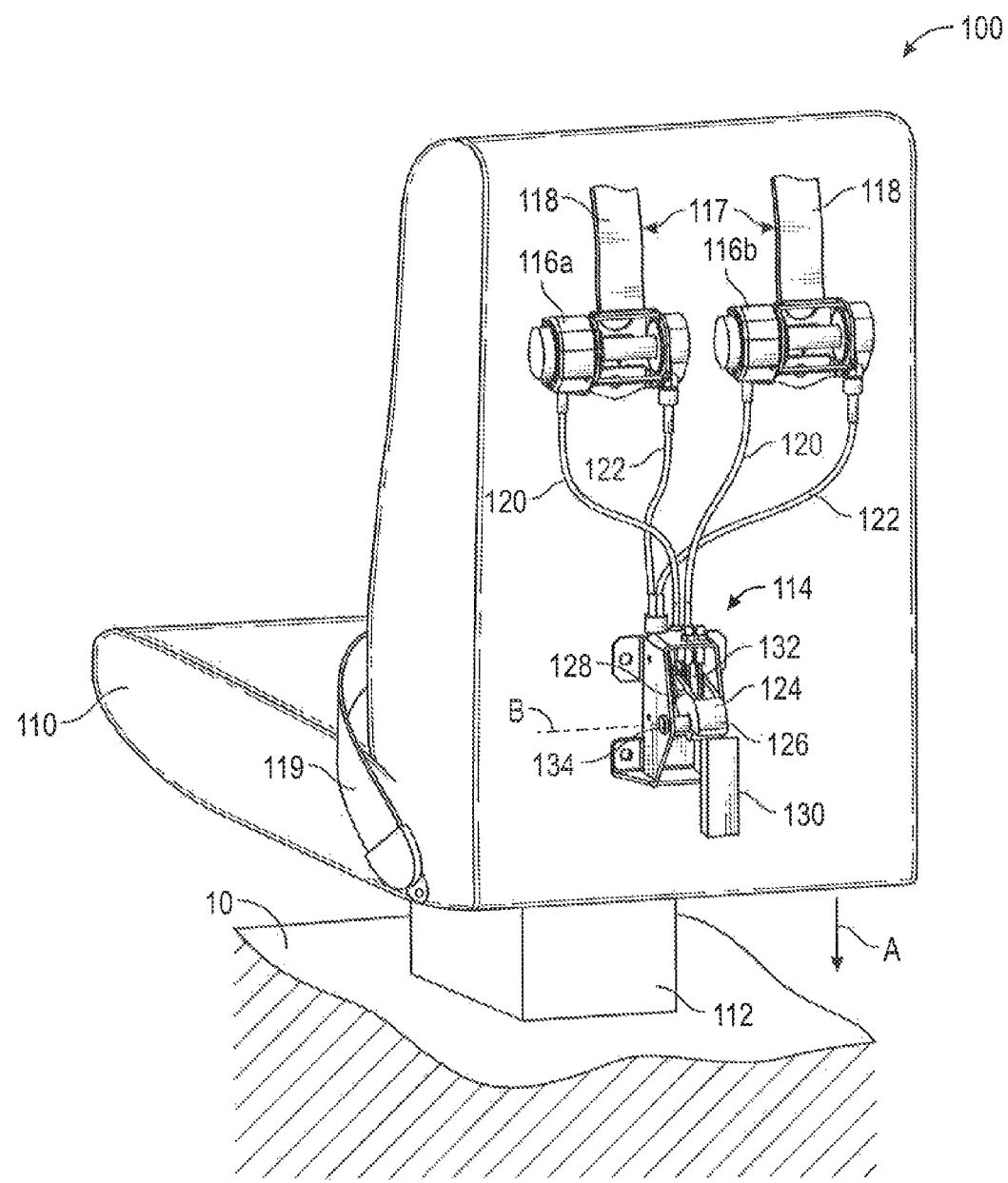
FIG. 1 is an isometric view of a vehicle seat having a restraint system pretensioner assembly configured in accordance with an embodiment of the present disclosure.

FIG. 1 is an isometric view of a seat 110 having a restraint system pretensioner assembly 100 configured in accordance with an embodiment of the present disclosure. The seat 110 is mounted in a vehicle 10 and is movable vertically in response to a sudden impact, explosion, or other sudden acceleration or deceleration (in a vertical direction). The seat 110 can include a stroking device or stroking mechanism 112 which may be provided in any form that moves or allows the seat 110 to move vertically downward relative to the vehicle 10 in the direction of arrow A during a detonation, explosion, or other event that suddenly accelerates the vehicle 10 upwardly. As used herein, downward means generally in the direction of gravity. With the vehicle in a normal upright position, for example, downward is shown by the arrow A in FIG. 1.

As discussed above, stroking devices generally allow a seat to move downwardly during an impact. In some embodiments, however, stroking devices such as the stroking mechanism 112 can be configured to permit the seat 110 to be movable in other directions, such as fore and aft, side to side, or any combination thereof. The stroking mechanism 112 accordingly may be attached to the back, the bottom, or even the sides of the seat 110. In addition, some blast resistant seats configured in accordance with embodiments of the present disclosure can be suspended within the vehicle 10. The pretensioners shown in the drawings and described herein may be used with virtually any such type of blast resistant seat.

The pretensioner assembly 100 can include a loading mechanism 114 and locking retractors 116 (identified individually as a first locking retractor 116a and a second locking retractor 116b), all of which can be mounted to the seat 110. Although referred to herein as the locking retractors 116, as further described below, the locking retractors 116 can provide for pretensioning and/or locking. The assembly 100 can also include a restraint harness 117 having shoulder straps 118. The restraint harness 117 can be mounted to the seat 110 and operably coupled to the retractors 116. The harness 117 extends upward from the retractors 116 and the shoulder straps 118 pass over a top of the seat 110. In several embodiments, the shoulder straps 118 can be integrated with other portions of the harness 117. For example, in some embodiments, the shoulder straps 118 can be coupled to a lap belt portion 119 of the harness 117.

The assembly 100 can also include pretensioning cable assemblies 120 and locking cable assemblies 122 that can operably couple the loading mechanism 114 to the retractors 116. The pretensioning cable assemblies 120 and the locking cable assemblies 122 can be constructed in a variety of suitable manners to transmit motion from the loading mechanism 114 to the retractors 116. In the illustrated embodiment, for example, the pretensioning cable assemblies 120 and the locking cable assemblies 122 are Bowden cable assemblies that each include an outer cable guide or housing and an internal cable. The loading mechanism 114 includes a pivotable arm 124 having a first end portion 126 and a second end portion 128. The arm 124 rotates about a pivot 134 having an axis B that is generally parallel with a base of the seat 110 and perpendicular to the stroking motion of the seat 110. The first end portion 126 is positioned to contact a fixed portion 130 of the vehicle 10, and the second end portion 128 is coupled to a pulley 132 that is in operable engagement with the pretensioning cable assemblies 120. The fixed portion 130 does not move relative to the vehicle 10 when the seat 110 moves up and down via the stroking mechanism 112.

As described in greater detail below, when the seat 110 moves downward relative to the vehicle 10, the fixed portion 130 urges the first end portion 126 to pivot upwardly, and the second end portion 128 moves downwardly with the pulley 132. The downward motion of the pulley 132 pulls on the pretensioning cable assemblies 120 causing retraction of the shoulder straps 118 into the retractors 116. The downward motion of the second end portion 128 transmits a pushing force on the locking cable assemblies 122, locking the retractors 116 and preventing outward extension of the shoulder straps 118.

Figure 2A:
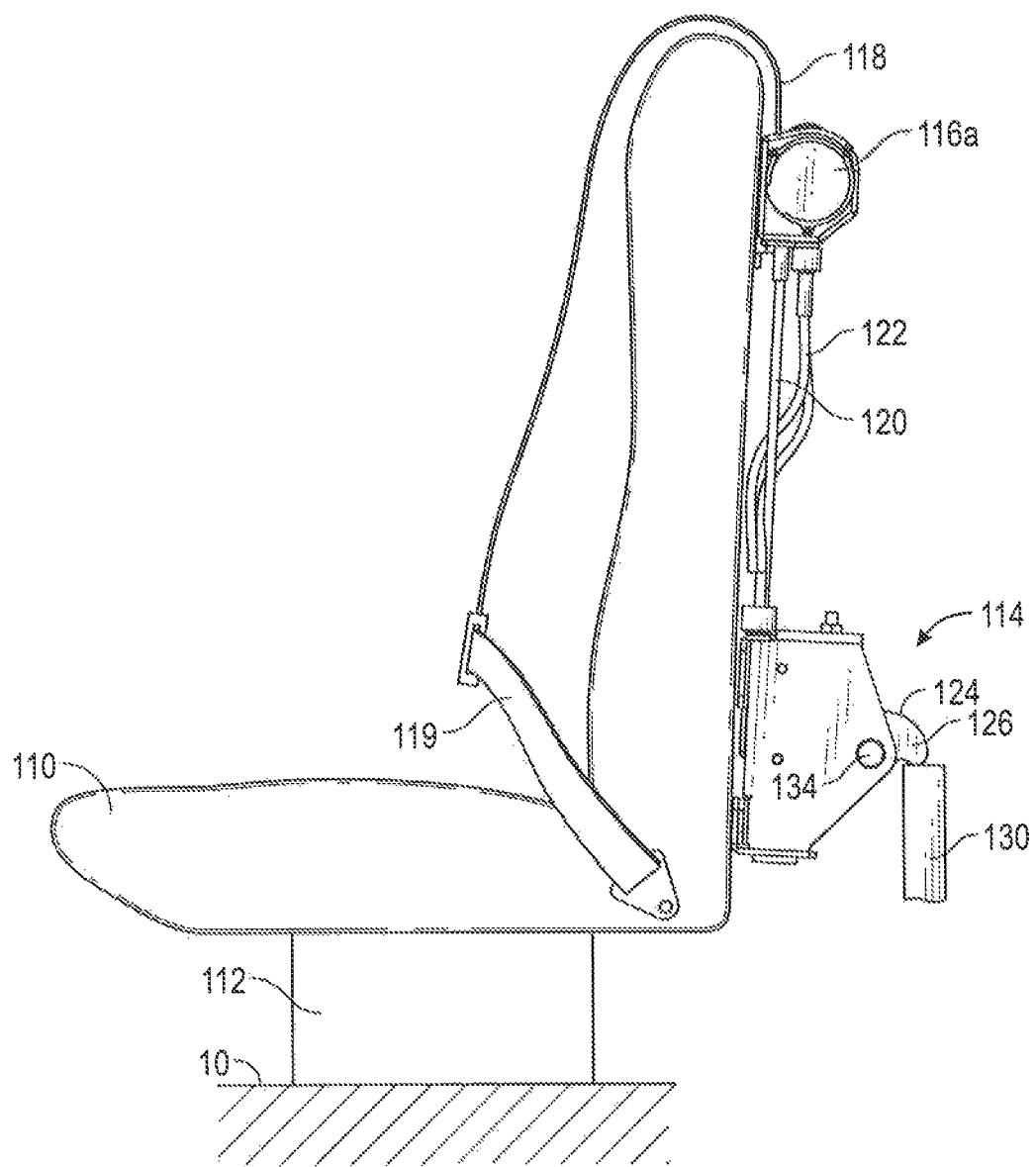
FIG. 2A is a partially schematic side view of the seat and pretensioner assembly of FIG. 1 in a neutral position and configured in accordance with an embodiment of the present disclosure.
Figure 2B:
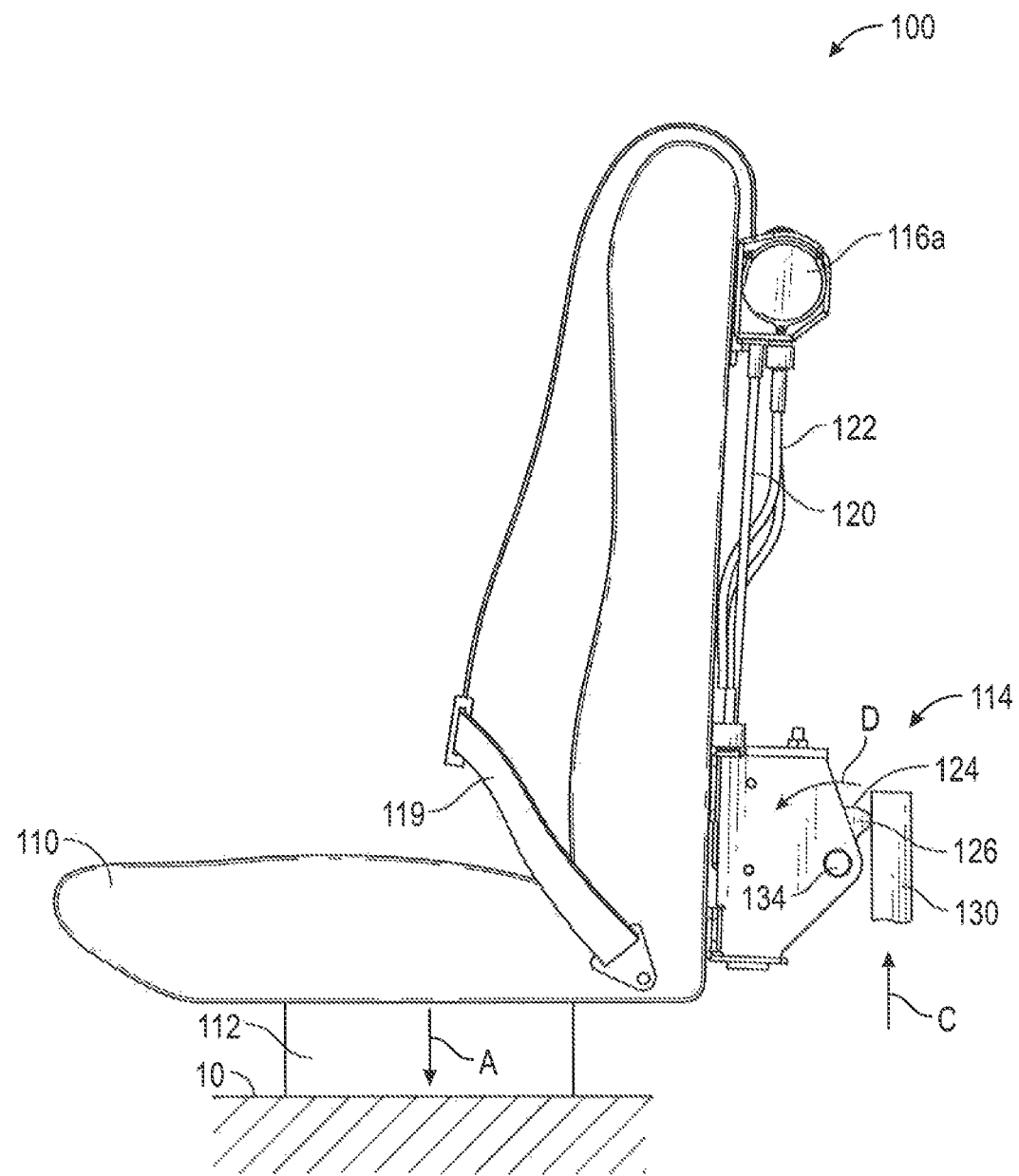
FIG. 2B is a partially schematic side view illustrating the seat and pretensioner assembly of FIG. 2A in a deployed position in accordance with an embodiment of the present disclosure.

FIG. 2A is a partially schematic side view of the seat 110 and the pretensioner assembly 100 in a neutral position and configured in accordance with an embodiment of the present disclosure. FIG. 2B is another partially schematic side view illustrating the seat 110 and the pretensioner assembly 100 in a deployed position in accordance with an embodiment of the present disclosure. Referring to FIGS. 1, 2A and 2B together, when the seat 110 moves relative to the vehicle 10 in the direction of arrow A, the fixed portion 130 of the vehicle 10 moves upward relative to the seat 110 as shown by the arrow C. This upward relative movement causes the fixed portion 130 to contact the first end portion 126 of the arm 124 and the arm 124 rotates about the pivot 134 as shown by arrow D. When the arm 124 rotates, the second end portion 128 moves the attached pulley 132 downwardly.

Figure 3A:
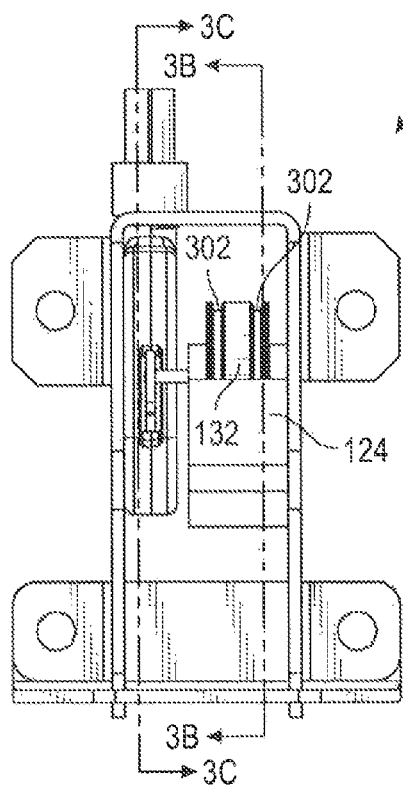
FIG. 3A is a front view of a loading mechanism configured in accordance with an embodiment of the present disclosure.
Figure 3B:
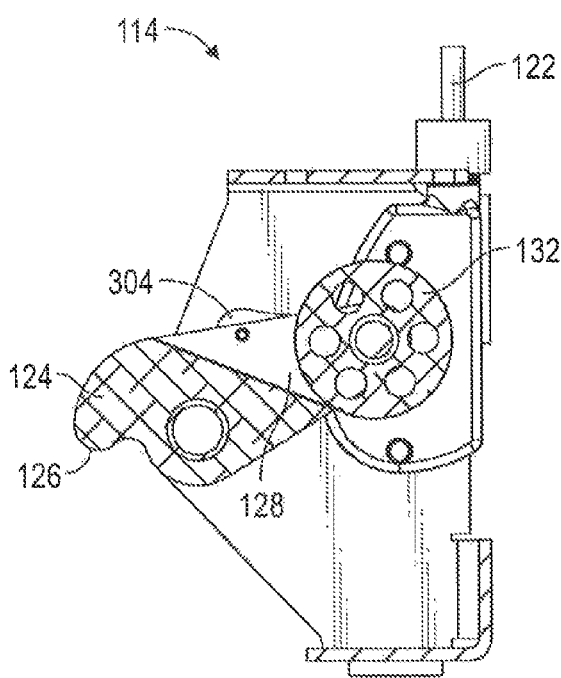
FIGS. 3B and 3C are cross-sectional side views of the loading mechanism of FIG. 3A configured in accordance with an embodiment of the present disclosure.
Figure 3C:
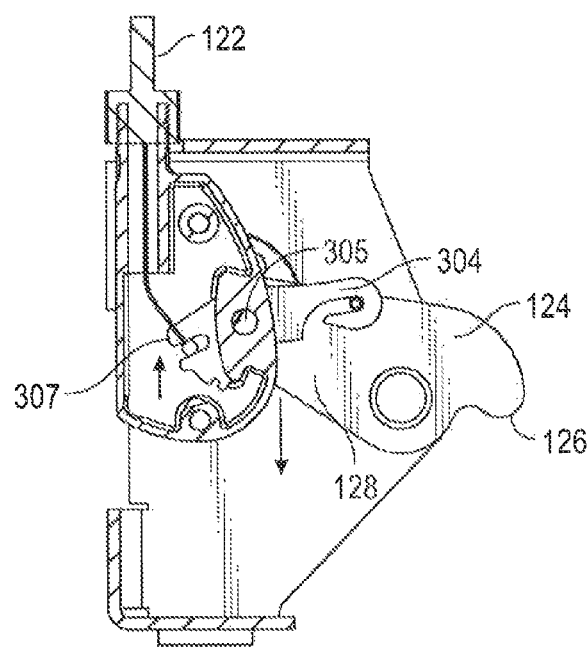

FIG. 3A is a front view of the loading mechanism 114 configured in accordance with an embodiment of the present disclosure. In the illustrated embodiment, the pulley 132 includes grooves 302 to engage and guide the internal cables of the pretensioning cable assemblies 120. FIGS. 3B and 3C are cross-sectional side views along the lines 3B-3B and 3C-3C, respectively, of FIG. 3A, and illustrating several components of the loading mechanism 114 configured in accordance with an embodiment of the present disclosure. In the illustrated embodiment, a rocker arm 304 is operably engaged with the pivotable arm 124. As shown in FIG. 3C, movement of the second end portion 128 of the pivotable arm 124 downward causes the rocker arm 304 to rotate above a pivot point 305, urging a distal end portion 307 of the rocker arm 304 upward to push on the inner cables of the locking cable assemblies 122. Movement of the locking cable assemblies 122 can engage components of the retractors 116 to lock the retractors 116 and prevent outward motion or payout of the shoulder straps 118.

Figure 4:
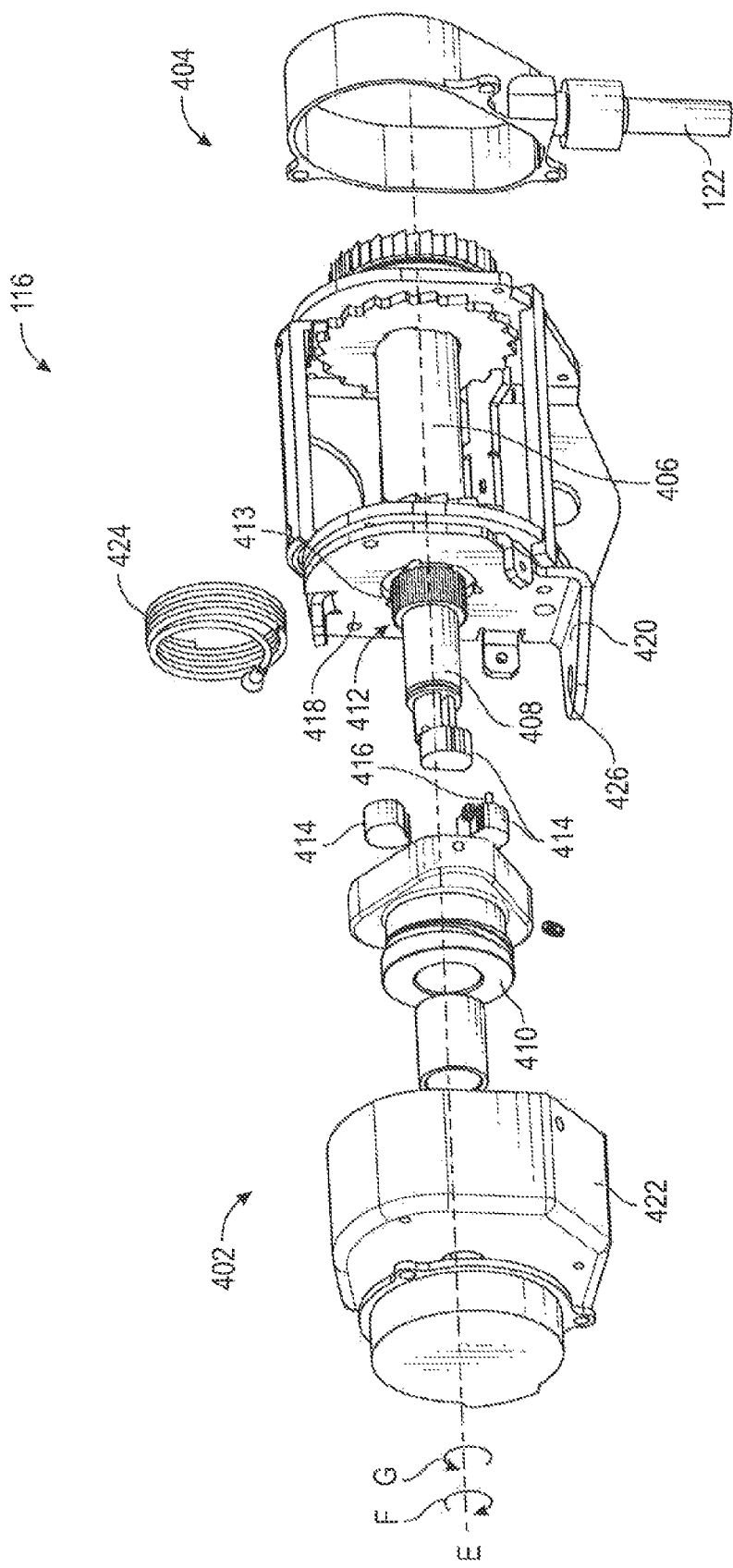
FIG. 4 is an exploded isometric view of a locking retractor configured in accordance with an embodiment of the present disclosure.

FIG. 4 is an exploded isometric view of the locking retractor 116 configured in accordance with an embodiment of the present disclosure. In the illustrated embodiment, the locking retractor 116 includes a spool 406 that is attached to a shaft 408 that extends through the retractor 116. The shaft 408 and spool 406 can rotate about an axis E to pay out or retrieve the shoulder straps 118. In particular, clockwise rotation about the axis E in the direction of arrow F pays out the shoulder straps 118, while counter-clockwise rotation about the axis E in the direction of arrow G retracts the shoulder straps 118. The retractor 116 can include a pretensioning portion 402 and a locking portion 404. The locking portion 404 can include components (e.g., gears, pawls, springs, etc.) that operate to lock the retractor 116 in response to motion (e.g., pushing motion) of the locking cable assembly 122. In several embodiments, the retractor components that operate to lock the retractor 116 in response to motion of the locking cable assembly 122 can be conventional components arranged in a conventional manner well known to those of skill in the art.

The pretensioning portion 402 can include a hub 410 that can be rotatably positioned on the shaft 408. A plurality of ratchets 414 having pins 416 are positioned at least partially within the hub 410 and can releasably engage with teeth 413 of a gear 412 on the shaft 408, as described in more detail below. The pretensioning cable assemblies 120 (FIG. 1) can include an internal pretensioning cable 424, a portion of which wraps around the hub 410. The shaft 408 extends through a locking plate 418 having a tab 420. A portion of the internal cable 424 can extend downward through a cable opening 426 in the tab 420 and into the external guide of the pretensioning cable assembly 120 (FIG. 1). In response to downward motion of the pulley 132 (FIG. 1), a portion of the internal cable 424 is pulled downward through the cable opening 426, unwinding at least a portion of the internal cable 424 from the hub 410, and thereby rotating the hub 410 and the associated ratchets 414 about the axis E in the direction of arrow G. The rotation of the ratchets 414 around the shaft 408 in the direction of arrow G causes the ratchets 414 to engage with the shaft 408, resulting in corresponding rotation of the shaft 408 in the direction of arrow G to retract the shoulder straps 118, as described in more detail below. A cover 422 can be positioned to at least partially enclose several of the components of the pretensioning portion 402.

Figure 5:
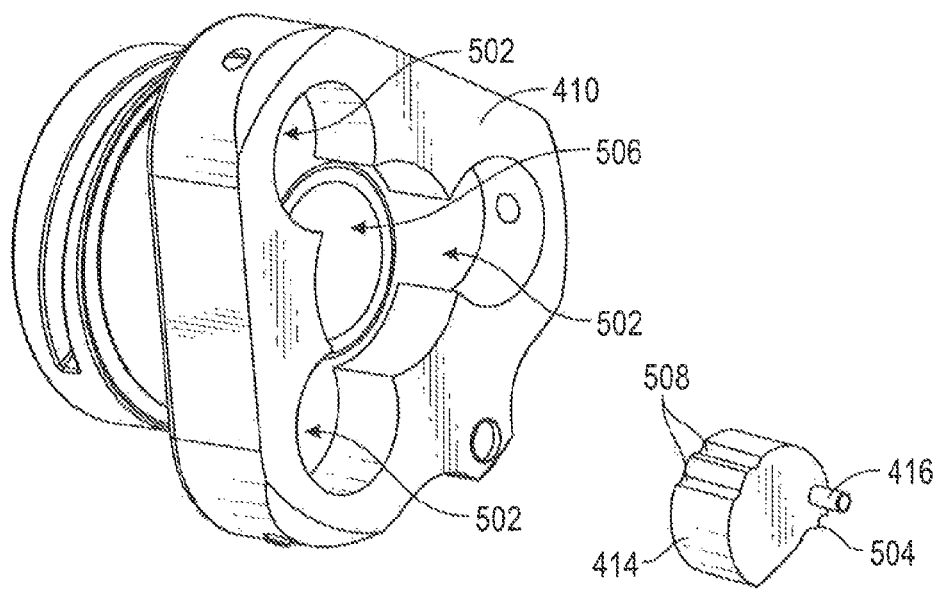
FIG. 5 is an isometric view of a hub and a ratchet configured in accordance with an embodiment of the present disclosure.

FIG. 5 is an isometric view of the hub 410 and a ratchet 414 configured in accordance with an embodiment of the present disclosure. In the illustrated embodiment, the hub 410 includes a plurality of ratchet pockets 502. The ratchet pockets 502 are positioned around a shaft opening 506 and can rotatably receive the ratchets 414. The hub 410 can be positioned on the shaft 408 with the gear 412 aligned with the ratchet pockets 502. Each of the ratchets 414 can include one or more features that engage the gear teeth 413. For example, in the illustrated embodiment, each of the ratchets 414 can include at least one ratchet tooth 504 that engages the gear teeth 413. Additionally, each of the ratchets 414 can include detents (e.g., two detents 508) that can assist in the rotational positioning of the ratchets within the ratchet pockets 502, as described in more detail below.

Figure 6:
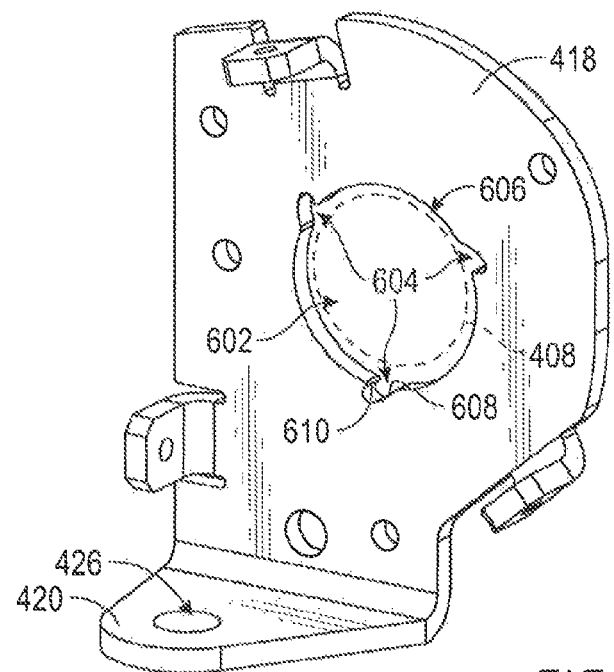
FIG. 6 is an isometric view of a locking plate configured in accordance with an embodiment of the present disclosure.

FIG. 6 is an isometric view of the locking plate 418 configured in accordance with an embodiment of the present disclosure. In the illustrated embodiment, the locking plate 418 includes an aperture or opening 602. The shaft 408 can extend centrally through the opening 602, creating an annular gap or track 606 between the shaft 408 and the sidewall or sidewalls of the opening 602. The sidewall or sidewalls can define the opening 602 which can include a plurality of notches or recesses 604 positioned along the circumference of the opening 602. The recesses 604 can have a sloping portion 608 and a catch portion 610. When the hub 410 is positioned on the shaft 408 with the ratchets 414 positioned within the ratchet pockets 502, the pins 416 of the ratchets 414 extend at least generally parallel to the axis E (FIG. 4) and into either the recesses 604, or into the track 606.

Figure 7A:
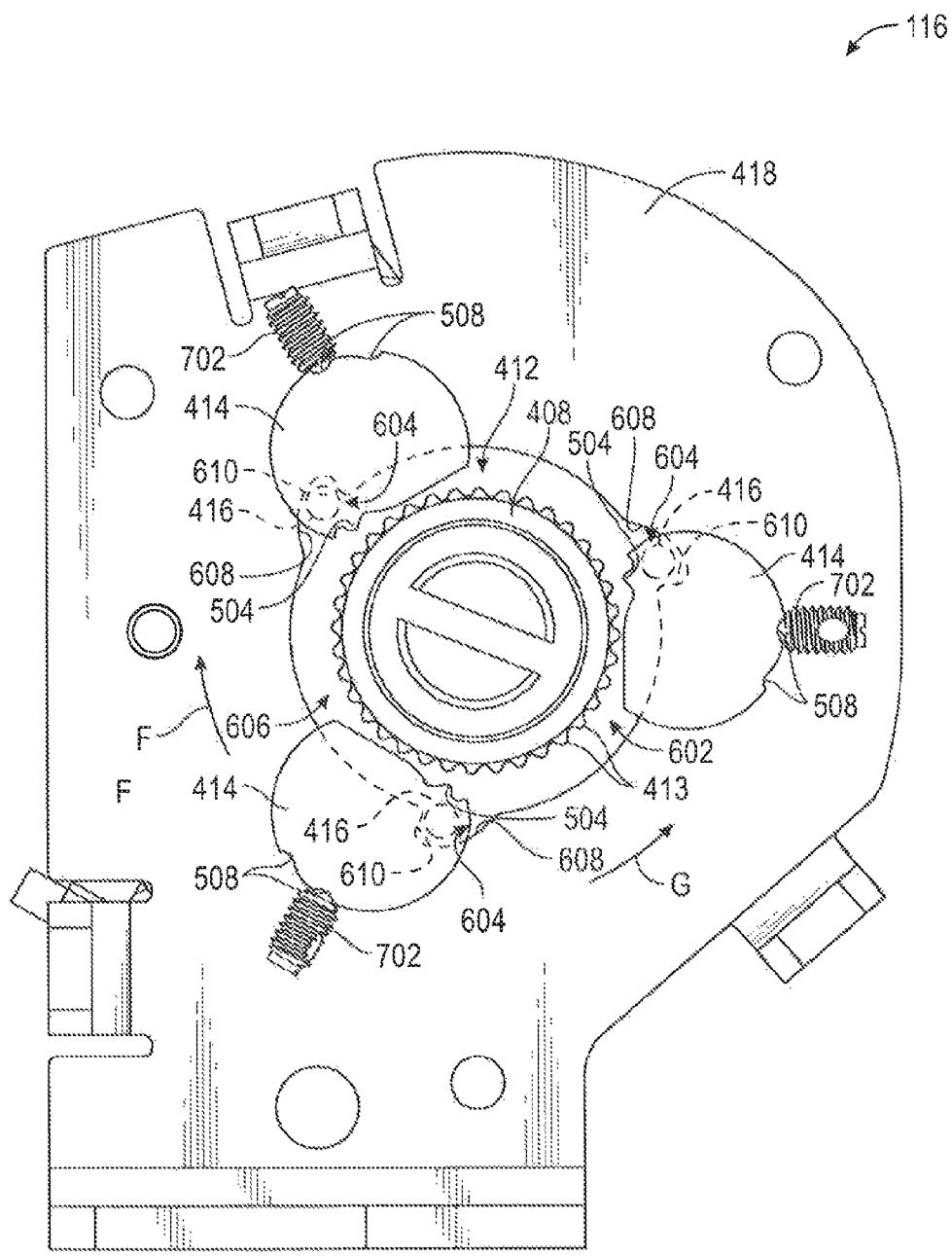
FIGS. 7A and 7B are side views of several components of a locking retractor configured in accordance with an embodiment of the present disclosure.

FIG. 7A is a side view of several components of the retractor 116 configured in accordance with an embodiment of the present disclosure. In the illustrated embodiment, the ratchets 414 are positioned around the shaft 408 and within the ratchet pockets 502 (not shown in FIG. 7A for clarity). During normal operation of the vehicle 10 (e.g., with the seat positioned as shown in FIG. 2A), the ratchets 414 are generally positioned as shown in FIG. 7A, with the pins 416 extending into the recesses 604, and the ratchet teeth 504 disengaged from the gear teeth 413. Each of the ratchet pockets 502 includes a corresponding set screw 702 (e.g., a spring loaded set screw or a ball-nosed spring plunger) that engages with the detents 508 of the corresponding ratchet 414. The set screws 702 can at least partially maintain the rotational position of the corresponding ratchets 414 within the associated ratchet pockets 502. With the components positioned as shown in FIG. 7A, the shaft 408 and the spool 406 (FIG. 4) are free to rotate in the direction of arrow F to pay out the shoulder straps 118.

Figure 7B:
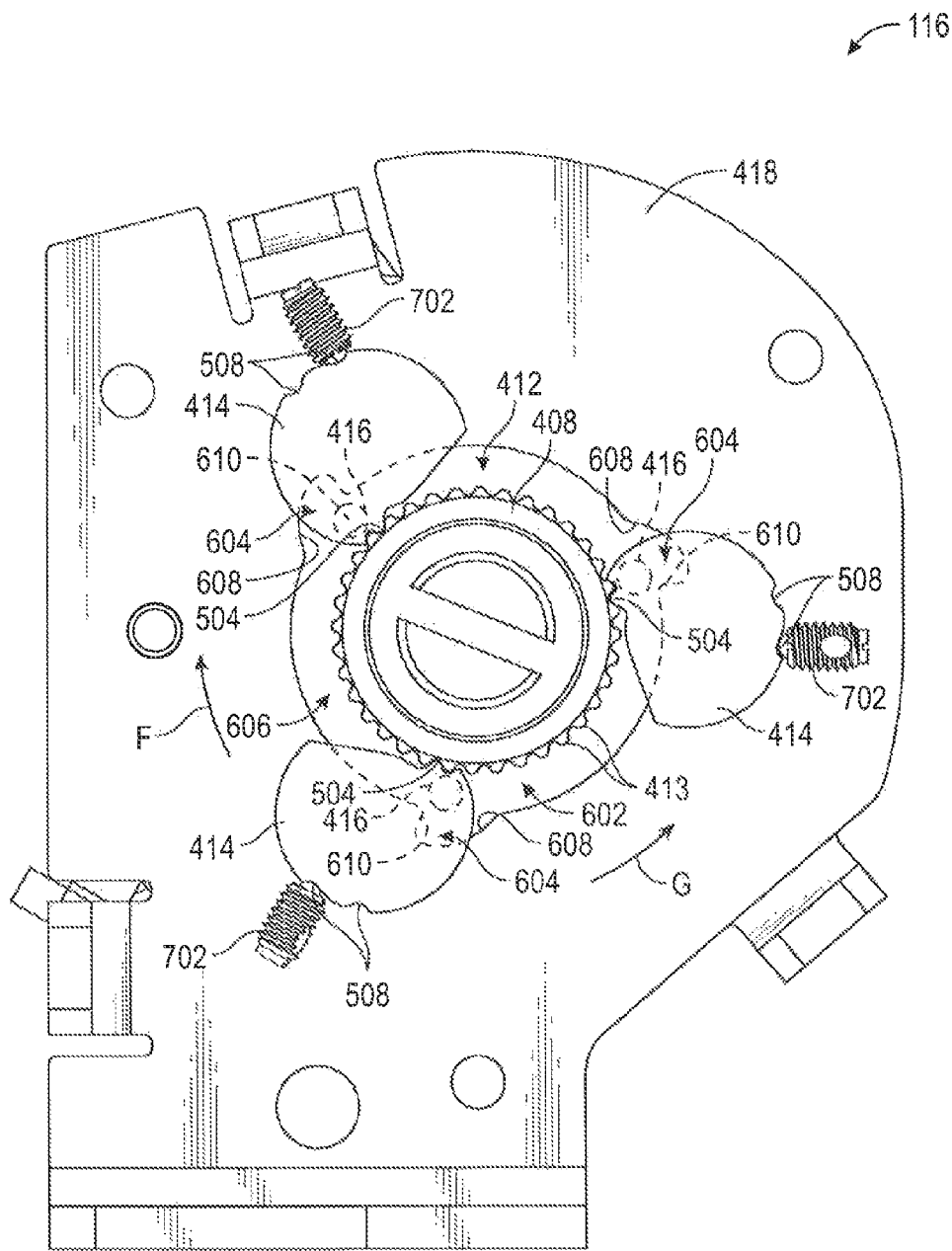

FIG. 7B is a side view of several components of the retractor 116 configured in accordance with an embodiment of the present disclosure. Referring to FIGS. 2B, 4, 5, 7A and 7B together, when the vehicle 10 experiences an event that results in the seat 110 moving to the position shown in FIG. 2B (e.g., an explosion that accelerates the vehicle 10 in a vertical direction), downward motion of the internal cable 424 through the cable opening 426 rotates the hub 410 and the ratchets 414 around the shaft 408 in the direction of arrow G. As the ratchets 414 move in the direction of arrow G from the position shown in FIG. 7A, the associated pins 416 are brought into contact with the sloping portions 608, forcing the pins 416 into the track 606 and rotating the ratchets 414 within the associated ratchet pockets 502. The rotation of the ratchets 414 within the ratchet pockets 502 brings the ratchet teeth 504 into contact with the gear teeth 413, "locking" the hub 410 to the shaft 408. The tolerance between the pins 416 and the track 606 can help to maintain the rotational position of the ratchets 414 within the ratchet pockets 502, such that the teeth 504 maintain engagement with the gear teeth 413. As the hub 410 is further rotated in the direction of arrow G by the downward motion of the internal cable 424, the pins 416 travel along the track 606, and the ratchet teeth 504 drive the gear teeth 413, thereby rotating the shaft 408 and the attached spool 406 in the direction of arrow G. The rotation of the spool 406 in the direction of arrow G retracts the shoulder straps 118 and pretensions the restraint harness 117.

In some embodiments configured in accordance with the present technology, the pretensioner assembly 100 can be reset to allow for pretensioning in a second event that follows a first or initial pretensioning event. For example, after a first event that pretensions the restraint harness 117, and when the retractor 116 is no longer locked via the locking cable assemblies 122, the shoulder straps 118 can be paid out via rotation of the shaft 408 in the direction of arrow F. In particular, when the ratchet teeth 504 are engaged with the gear teeth 413 (as shown in FIG. 7B), rotation of the shaft 408 in the direction of arrow F can push the gear teeth 413 against the ratchet teeth 504. The exertion of the gear teeth 413 includes a component of force that pushes the ratchets 504 outwardly, pushing the pins 416 against the sidewalls of the opening 602. While the pins 416 are in between the recesses 604, the pins 416 are maintained in the track 606 by the sidewalls of the opening 602. When the pins advance to a position adjacent to the recesses 604, the pins 416 move outwardly and are caught by the catch portions 610. The catch portions 610 engage the pins 416 (as shown in FIG. 7A), rotating the ratchets 414 within the ratchet pockets 502 (FIG. 5) to disengage the teeth 504 from the gear 412. These and/or other steps may be performed to prepare the pretensioner assembly 100 and the seat 110 for a subsequent or second pretensioning event.

Although the components and features of the embodiments illustrated in FIGS. 1-7B are shown in various arrangements and positions, other configurations of the components and features of the present technology are within the scope of the disclosure. For example, although particular embodiments described herein include three ratchets arranged around a shaft, alternative embodiments may include more or fewer ratchets. Similarly, the shapes and sizes of the ratchets, the ratchet pockets, and/or other components can be altered and still fall within the scope of the present disclosure. Additionally, the positioning of components described with respect to particular embodiments herein may be altered in alternative embodiments. For example, locking retractors in accordance with the present technology may have gears that are positioned internal to a shaft. Moreover, the gears may be integral with a shaft, or they may be operably coupled to a shaft. While the pretensioner assemblies described herein include ratchets, hubs, and various other components, pretensioner assemblies in accordance with the present technology can include additional and/or fewer components arranged in a variety of suitable configurations.

From the foregoing, it will be appreciated that specific embodiments of the invention have been described herein for purposes of illustration, but that various modifications may be made without deviating from the spirit and scope of the various embodiments of the invention. Additionally, aspects of the invention described in the context of particular embodiments may be combined or eliminated in other embodiments. Furthermore, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A restraint system pretensioner assembly comprising:
a loading mechanism having a movable arm and a pulley;
a retractor having a spool configured to receive a strap of a restraint harness; and
a cable operably coupling the loading mechanism to the retractor, wherein the cable is operably engaged with the pulley, and wherein movement of the arm rotates the pulley to retract the cable and rotate the spool to retract the strap.

2. The restraint system pretensioner assembly of claim 1 wherein the retractor includes a hub rotatably coupled to a shaft, wherein the spool is attached to the shaft, and wherein retraction of the cable rotates the hub to rotate the shaft and retract the strap.

3. The restraint system pretensioner assembly of claim 2 wherein the shaft includes a gear, and wherein the retractor further includes a ratchet operable via the hub to engage the gear and rotate the shaft.

4. A restraint system pretensioner assembly comprising:
a loading mechanism having a movable arm;
a retractor having a spool configured to receive a strap of a restraint harness;
a pretensioning cable operably coupling the loading mechanism to the retractor, wherein movement of the arm retracts the pretensioning cable and rotates the spool to retract the strap; and
a locking cable operably coupling the loading mechanism to the retractor, wherein movement of the arm operates the locking cable to prevent payout of the strap.

5. A restraint system pretensioner assembly comprising:
a loading mechanism having a movable arm;
a retractor having:
a spool configured to receive a strap of a restraint harness;
a shaft, wherein the spool is fixedly attached to the shaft;
a gear operably coupled to the shaft;
a hub rotatably coupled to the shaft; and
a plurality of ratchets operably coupled to the hub; and
a cable operably coupling the loading mechanism to the hub, wherein movement of the arm retracts the cable, and wherein retraction of the cable rotates the hub to engage the ratchets with the gear and rotates the spool to retract the strap.

6. The restraint system pretensioner assembly of claim 5 wherein individual ratchets include corresponding pins, wherein the retractor includes a locking plate having an opening defined by a sidewall, wherein the shaft extends through the opening to form a track between the shaft and the sidewall, and wherein the pins extend into the track.

7. A pretensioning retractor comprising:
a shaft extending along an axis through at least a portion of the retractor;
a gear operably coupled to the shaft;
a spool coupled to the shaft and configured to receive a strap of a restraint harness;
a hub rotatably coupled to the shaft and having a ratchet pocket;
a ratchet having a pin and a ratchet tooth, wherein the ratchet is positionable at least partially within the ratchet pocket with the pin extending at least generally parallel to the axis and the ratchet tooth positioned to selectively engage the gear;
a cable coupled to the hub and operable to rotate the hub, wherein rotation of the hub engages the ratchet tooth with the gear to rotate the shaft and the spool and retrieve at least a portion of the strap; and
a locking plate having an opening defined by a sidewall, wherein the shaft extends through the opening to define a track between the shaft and the sidewall, and wherein the pin extends into the track.

8. The pretensioning retractor of claim 7 wherein the opening includes a recess, wherein the pin extends into the recess, and wherein the rotation of the hub moves the pin out of the recess and rotates the ratchet to engage the ratchet tooth with the gear.

9. The pretensioning retractor of claim 8 wherein the recess includes a sloping portion, and wherein rotation of the hub brings the pin into contact with the sloping portion to move the pin out of the recess and into the track.

10. The pretensioning retractor of claim 9 wherein rotation of the hub is in a first direction, wherein the recess further includes a catch portion, and wherein rotation of the hub in a second direction, opposite to the first direction, brings the pin into contact with the catch portion to move the pin out of the track and into the recess.

11. The pretensioning retractor of claim 7 wherein the ratchet pocket is a first ratchet pocket, wherein the ratchet is a first ratchet, wherein the hub further includes a second ratchet pocket and a third ratchet pocket, and wherein the pretensioning retractor further comprises a second ratchet positioned at least partially within the second ratchet pocket and a third ratchet positioned at least partially within the third ratchet pocket.

12. A pretensioning retractor comprising:
a shaft extending along an axis through at least a portion of the retractor;
a gear operably coupled to the shaft;
a spool coupled to the shaft and configured to receive a strap of a restraint harness;
a hub rotatably coupled to the shaft and having a ratchet pocket;

a ratchet having a pin and a ratchet tooth, wherein the ratchet is positionable at least partially within the ratchet pocket with the pin extending at least generally parallel to the axis and the ratchet tooth positioned to selectively engage the gear;

a cable coupled to the hub and operable to rotate the hub, wherein rotation of the hub engages the ratchet tooth with the gear to rotate the shaft and the spool and retrieve at least a portion of the strap; and a tab having a cable opening, wherein the cable extends from the hub through the cable opening.

13. A pretensioning retractor comprising:

a shaft extending along an axis through at least a portion of the retractor;

a gear operably coupled to the shaft;

a spool coupled to the shaft and configured to receive a strap of a restraint harness;

a hub rotatably coupled to the shaft and having a ratchet pocket;

a ratchet having a pin and a ratchet tooth, wherein the ratchet is positionable at least partially within the ratchet pocket with the pin extending at least generally parallel to the axis and the ratchet tooth positioned to selectively engage the gear, wherein the ratchet includes a detent, wherein the hub includes a set screw, and wherein the set screw engages the detent to maintain a rotational position of the ratchet in relation to the ratchet pocket; and a cable coupled to the hub and operable to rotate the hub, wherein rotation of the hub engages the ratchet tooth with the gear to rotate the shaft and the spool and retrieve at least a portion of the strap.

14. A restraint system pretensioner assembly comprising:

a seat positionable within a vehicle and having a stroking device configured to enable vertical motion of the seat;

a retractor associated with the seat and having a spool configured to be operably coupled to a harness;

a loading mechanism associated with the seat and having a pivotable arm; and a pretensioning cable assembly having a pretensioning cable operably coupling the loading mechanism to the retractor, wherein the pivotable arm is configured to rotate in response to downward motion of the seat relative to the vehicle and retract the pretensioning cable, thereby rotating the spool and retracting at least a portion of the harness.

15. The restraint system pretensioner assembly of claim 14, further comprising a locking cable assembly having a locking cable, wherein the pivotable arm is rotatable to move at least a portion of the locking cable to prevent payout of the harness.

16. The restraint system pretensioner assembly of claim 14 wherein the loading mechanism includes a pulley operably coupled to the pivotable arm, wherein the pretensioning cable is positioned to engage the pulley, and wherein rotation of the pivotable arm includes motion of the pulley to retract the pretensioning cable.

17. The restraint system pretensioner assembly of claim 14 wherein the retractor includes a shaft and a hub, wherein the spool is fixedly attached to the shaft, wherein the hub is rotatably coupled to the shaft, wherein the pretensioning cable is coupled to the hub, and wherein retraction of the pretensioning cable rotates the shaft and the spool via rotation of the hub.

18. The restraint system pretensioner assembly of claim 14 wherein the retractor includes a shaft and a plurality of ratchets, and wherein retraction of the pretensioning cable includes rotation of the shaft via rotation of the plurality of ratchets.

19. The restraint system pretensioner of claim 14, further comprising means for locking the retractor to prevent payout of the harness.

20. The restraint system pretensioner of claim 14, further comprising:

a shaft extending along an axis through at least a portion of the retractor, wherein the spool is fixedly attached to the shaft;

a gear operably coupled to the shaft; and means for rotating the shaft via the gear.

* * * * *